United States Patent [19]
Gencarelli

[11] Patent Number: 5,899,222
[45] Date of Patent: May 4, 1999

[54] BALL VALVE CONTROL SYSTEM

[76] Inventor: Angelo Gencarelli, 32 Highfield La., Nutley, N.J. 07110

[21] Appl. No.: 09/058,930

[22] Filed: Apr. 13, 1998

[51] Int. Cl.[6] .............................. F16K 5/06; F16K 27/06; F16K 31/53

[52] U.S. Cl. ..................... 137/294; 137/291; 137/364; 137/368; 137/561 A; 251/249.5; 251/292

[58] Field of Search .................................. 137/292, 291, 137/293, 294, 295, 364, 368, 369, 561 A; 251/248, 249.5, 292

[56] References Cited

U.S. PATENT DOCUMENTS

| 196,000 | 10/1877 | Flower | 137/294 |
|---|---|---|---|
| 252,888 | 1/1882 | Matthews | 137/294 |
| 407,417 | 7/1889 | Ramsey | 251/249.5 |
| 612,941 | 10/1898 | Bartholomew | 137/295 |
| 1,174,227 | 3/1916 | Campbell | 137/368 |
| 4,776,363 | 10/1988 | Avelli | 137/272 |

FOREIGN PATENT DOCUMENTS

| 119146 | 3/1901 | Germany | 137/294 |
|---|---|---|---|
| 2429100 | 1/1975 | Germany | 137/272 |

*Primary Examiner*—George L. Walton

[57] ABSTRACT

The present invention relates to an improved ball valve assembly which is adapted to be fitted into a water delivery device such as a spigot or fire hydrant. More specifically, the ball valve assembly is specifically installed and adapted for remote control. Such remote control enables the ball valve to be positioned at a location within the water delivery device to avoid damage. Thus, the remote control enables the ball valve to be resistant to cold weather or physical damage to the delivery device. The various components of the present invention, and the manner in which they interrelate, will be described in greater detail hereinafter.

3 Claims, 4 Drawing Sheets

BALL VALVE CONTROL SYSTEM

BACKGROUND OF THE INVENTION

1. Field of the Invention

The present invention relates to a new and improved ball valve control means and, more particularly, pertains to such a control means which allows for the remote control of a ball valve.

2. Description of the Prior Art

The use of ball valves is known in the prior art. More specifically, ball valves heretofore devised and utilized for the purpose of checking the flow of fluid are known to consist basically of familiar, expected, and obvious structural configurations, notwithstanding the myriad of designs encompassed by the crowded prior art which has been developed for the fulfillment of countless objectives and requirements.

The prior art discloses a large number of valves. For example, U.S. Pat. No. 4,770,388 to Carman discloses a latched valve handle. U.S. Pat. No. 4,649,952 to Jobe discloses a combined shut off and check valve. U.S. Design Patent 321,928 to Milo discloses a combined ball valve and check valve. U.S. Pat. No. 4,217,931 to Jackel discloses an adjustable check valve. U.S. Pat. No. 4,193,579 to massey discloses a detachable handle for control devices. Lastly, U.S. Pat. No. 3,954,251 to Callahan discloses a fluid system device.

In this respect, the ball valve control system according to the present invention substantially departs from the conventional concepts and designs of the prior art, and in doing so provides an apparatus primarily developed for the purpose of enabling a ball valve to be remotely placed relative to its control means.

Therefore, it can be appreciated that there exists a continuing need for a new and improved ball valve control system which can be used for remotely controlling the operation of a fluid dispensing device. In this regard, the present invention substantially fulfills this need.

SUMMARY OF THE INVENTION

In view of the foregoing disadvantages inherent in the known types of ball valves now present in the prior art, the present invention provides a new and improved ball valve control system. As such, the general purpose of the present invention, which will be described subsequently in greater detail, is to provide a new and improved ball valve control system and methods which have all the advantages of the prior art and none of the disadvantages.

To attain this, the present invention essentially comprises a new and improved ball valve assembly for use in combination with a ground mounted fire hydrant. The hydrant includes a fire hydrant housing having a lower extent, an upper extent and an intermediate extent therebetween, and a base flange secured intermediate the upper and lower extents for use in securing the hydrant to the ground such that the lower extent extends into the ground. Three outlets are formed within the upper extent of the hydrant. A water passage is formed within the lower extent of the hydrant housing. The hydrant also includes three flexible fluid couplings, with each of the fluid couplings interconnecting the water passage to one of the three outlets formed within the upper extent of the housing. A ball valve is rotatably secured within the water passage. The ball valve includes a fluid passage formed within a diameter of the ball valve. The ball valve has a first orientation wherein the ball valve prevents the flow of fluid within the water passage, and a second orientation wherein fluid is permitted to flow through the fluid passage of the ball valve and within the water passage. Control means are also included in the form of a pair of rotatable control rods which of which extend along the upper and lower extent of the hydrant housing. Each of the control rods is interconnected to a bevel gearing for use in controlling the orientation of the ball valve. Thus rotation of the control rods in a first sense functioning to bring the ball valve into the first orientation, while rotation of the control rods in a second sense functioning to bring the ball valve into a second orientation.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved ball valve control system which has all the advantages of the prior art ball valves and none of the disadvantages.

It is another object of the present invention to provide a new and improved ball valve control system which may be easily and efficiently manufactured and marketed.

It is a further object of the present invention to provide a new and improved ball valve control system which is of a durable and reliable construction.

An even further object of the present invention is to provide a new and improved ball valve control system which is susceptible of a low cost of manufacture with regard to both materials and labor, and which accordingly is then susceptible of low prices of sale to the consuming public, thereby making such a ball valve control system economically available to the buying public.

Even still another object of the present invention is to provide an improved ball valve assembly which is adapted to be fitted into a water delivery device such as a spigot or fire hydrant. More specifically, the ball valve assembly is specifically installed and adapted for remote control. Such remote control enables the ball valve to be positioned at a location within the water delivery device to avoid damage. Thus, the remote control enables the ball valve to be resistant to cold weather or physical damage to the delivery device. The various components of the present invention, and the manner in which they interrelate, will be described in greater detail hereinafter.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

With reference now to the drawings, and in particular to FIGS. 1 through 6 thereof, the preferred embodiment of the new and improved ball valve assembly is depicted embodying the principles and concepts of the present invention will be described. The present invention relates to an improved ball valve assembly which is adapted to be fitted into a water delivery device such as a spigot or fire hydrant. More specifically, the ball valve assembly is specifically installed and adapted for remote control. Such remote control enables the ball valve to be positioned at a location within the water delivery device to avoid damage. Thus, the remote control enables the ball valve to be resistant to cold weather or physical damage to the delivery device. The various components of the present invention, and the manner in which they interrelate, will be described in greater detail hereinafter.

Spigot Embodiment

Figure 2:
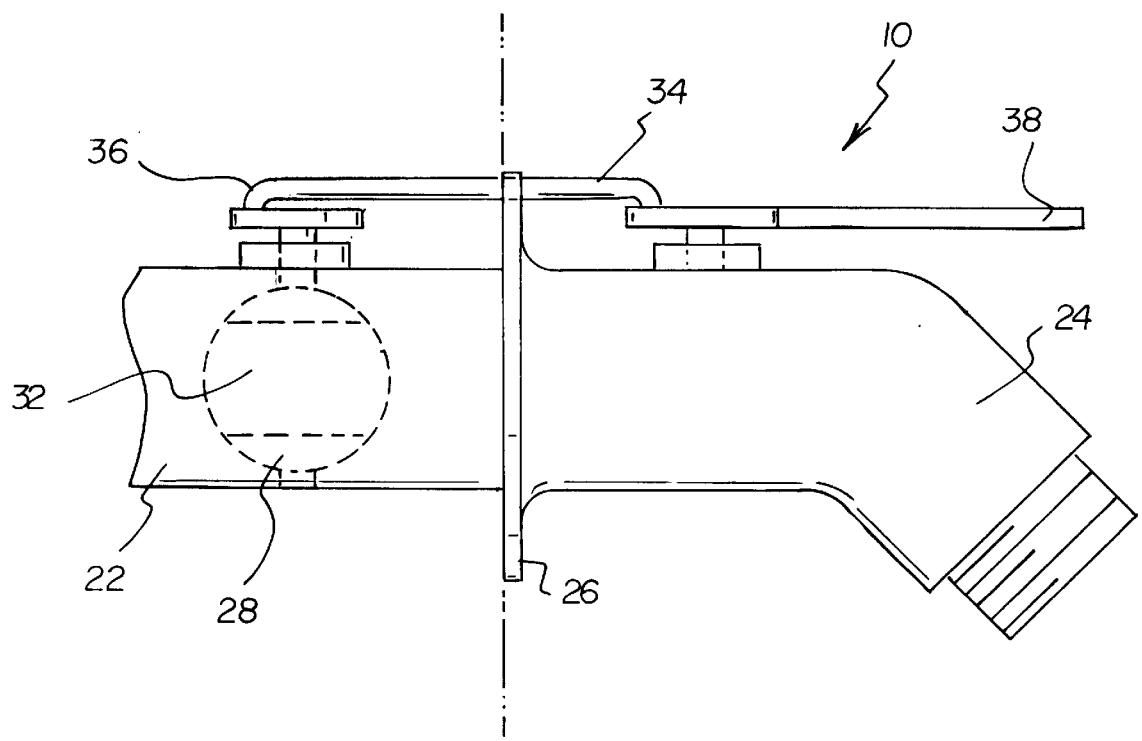
FIG. 2 is a primary embodiment of the ball valve control means.

The first embodiment of the present invention concerns a spigot configuration 10. Through the use of the spigot 10 the ball valve assembly can be secured to an enclosure, such as to a house. With reference to FIG. 2, the spigot 10 employs a length of pipe 20 defined by a first end 22, a second end 24 and an intermediate extent therebetween. Additionally, a flange 26 is secured intermediate the first 22 and second 24 ends of the pipe 20 for use in securing the length of pipe 20 to a wall. In this manner, the length of pipe intermediate the first end 22 and the flange 26 extends into the existing enclosure. With continuing reference to FIG. 2, the second end 24 of the length of pipe is bent at a 45 degree angle relative to the intermediate extent of the pipe. Additionally, the second end 24 of the pipe 20 may be threaded to enable a hose to be coupled thereto.

The ball valve 28 employed within the spigot 10 is rotatably secured within the pipe 20 intermediate the first end 22 and the flange 26. In this manner, when the spigot 10 is installed upon an enclosure, the ball valve 28 is positioned at a location within the enclosure. Thus, the effects of cold weather have a limited effect upon the operation of the ball valve 28. A fluid passage 32 is formed within a diameter of the ball valve 28. Thus, the ball valve 28 has a first orientation wherein the ball valve 28 prevents the flow of fluid within the pipe 20, and a second orientation wherein fluid is permitted to flow through the fluid passage 32 of the ball valve 28 and within the pipe 20.

A lever 34 is employed in rotating the ball valve 28 within the pipe 20. This lever 34 is defined by a first end 36, a second end 38 and an intermediate extent therebetween. With reference to FIG. 2, the first end 36 is pivotally interconnected to the ball valve 28. Through this interconnection the lever 34 can function to bring the ball valve 28 from the first to the second orientation. The second end 38 of the lever 34 is positioned proximate to the second end 24 of the pipe 20, with the intermediate extent of the lever being pivotally connected to the intermediate extent of the pipe. Through this arrangement both the lever 34, and the orientation of the ball valve 28, can be controlled from outside the enclosure.

Figure 1:
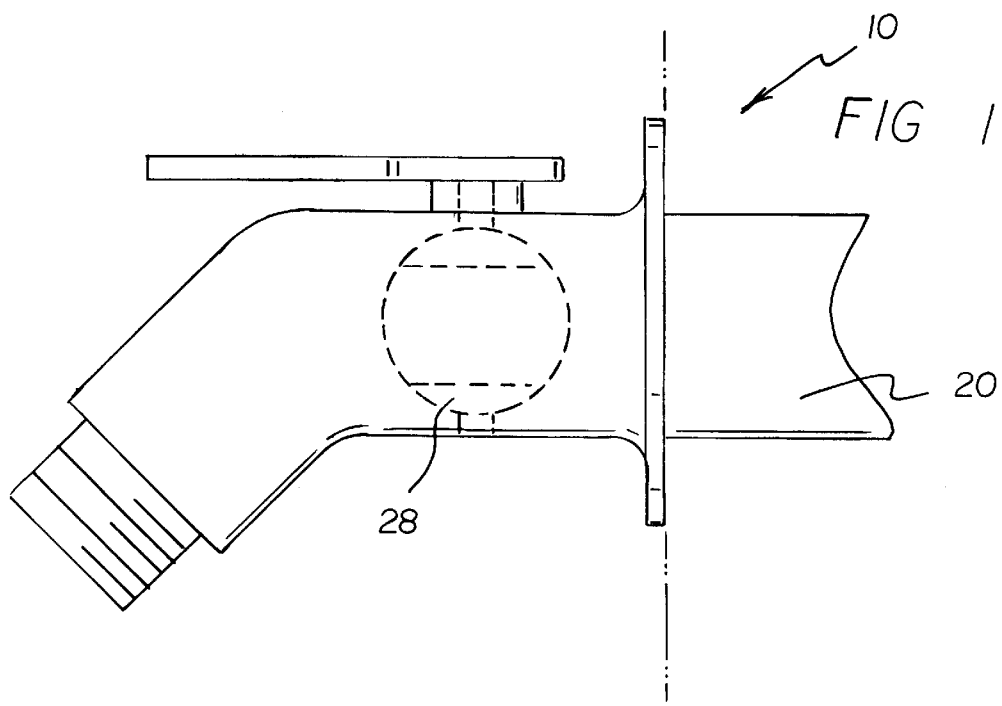
FIG. 1 is a perspective illustration of the preferred embodiment of the ball valve control system.

The embodiment of the invention depicted in FIG. 1, however, employs a lever 34 pivotally interconnected to a ball valve 28 positioned outside of the enclosure. This arrangement can be used in conjunction with pipe in non-cold weather climates.

Fire Hydrant Embodiment

Figure 5:
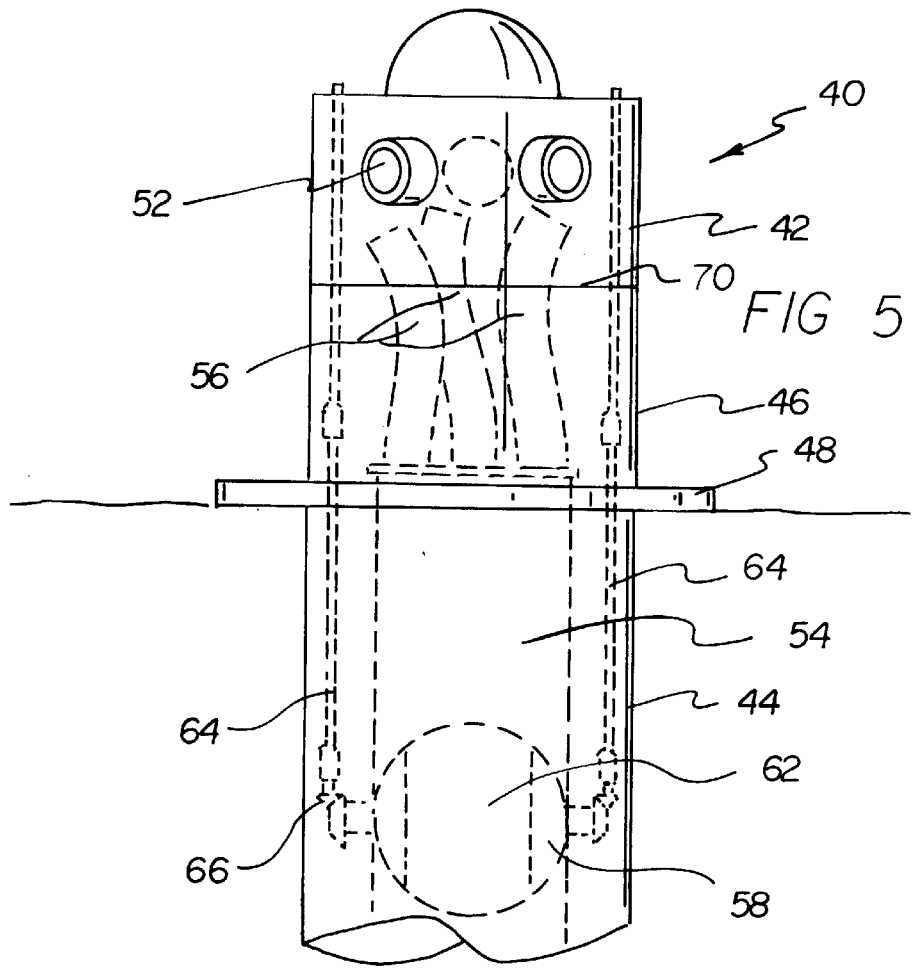
FIG. 5 is a view of the primary embodiment of the hydrant of the present invention.
Figure 6:
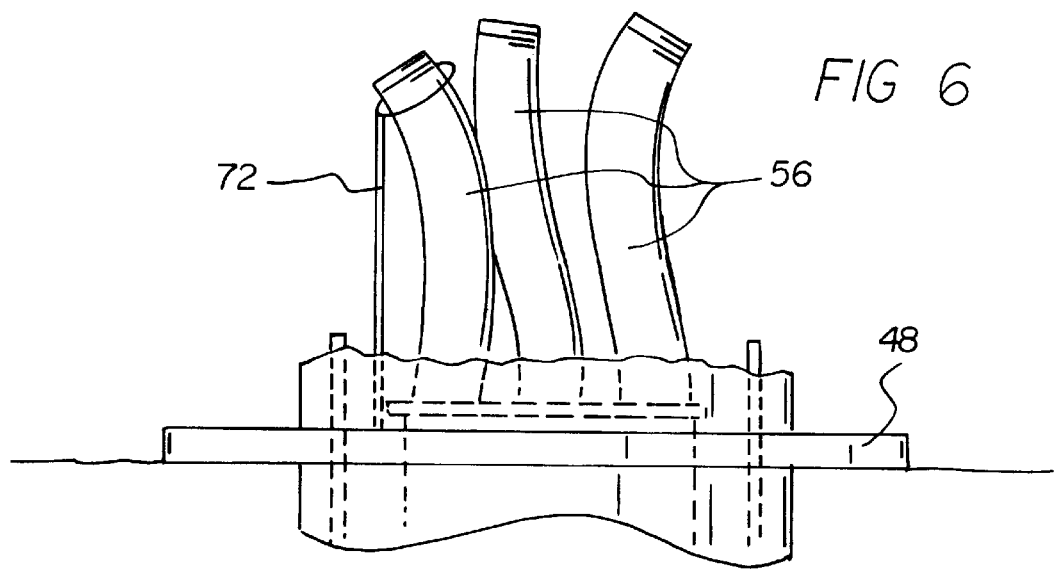
FIG. 6 is a detail of the flexible fluid couplings of the present invention.

The second embodiment of the present invention employs the ball valve assembly in conjunction with a ground mounted fire hydrant 40. The hydrant 40 depicted in FIG. 5 includes a fire hydrant housing 42 defined by a lower extent 44, an upper extent 46 and an intermediate extent therebetween. A base flange 48 is secured intermediate the upper 46 and lower 44 extents for use in securing the hydrant 40 to the ground. When so secured the lower extent 44 extends into the ground. With continuing reference to FIG. 5, the hydrant 40 includes a number of outlets and fluid couplings. In the perferred embodiment there are three outlets 52 formed within the upper extent 46 of the hydrant and three associated fluid couplings 56. Additionally, a water passage 54 is formed within the lower extent 44 of the hydrant housing 42. The three flexible fluid couplings 56 each serve to interconnect the water passage 54 to one of the three outlets 52 formed within the upper extent 46 of the housing 42. This is achieved via a stop plate positioned on top of the water passage 54 which divides the water passage 54 into three streams. With reference to FIG. 6, a saftey cord 72 is shown. This cord insures that the coupling 56 is not separated from the hydrant in the even of an accident. Furthermore, as indicated by reference numeral 70, the hydrant includes a break point 70 joining the upper and lower portions of the housing 42. This break point, in the event that the hydrant is hit, will permit the upper portion to break free from the lower portion.

The ball valve 58 of the hydrant embodiment 40 is rotatably secured within the water passage 54. With reference to FIG. 5, a fluid passage 62 is formed within a diameter of the ball valve 58. This ball valve 58 has a first orientation wherein the ball valve 58 prevents the flow of fluid within the water passage 54, and a second orientation wherein fluid is permitted to flow through the fluid passage 62 of the ball valve 58 and within the water passage 54.

Control means are included for use in controlling the operation of the ball valve 58. More specifically, as illustrated in FIG. 5, a pair of rotatable control rods 64 extend along the upper and lower extent of the hydrant housing 42. Each of the control rods 64 is interconnected to a system of bevel gears 66. Thus rotation of the control rods 64 in a first sense functions to bring the ball valve 58 into the first orientation, while rotation of the control rods 64 in a second sense functioning to bring the ball valve 58 into a second orientation.

Figure 3:
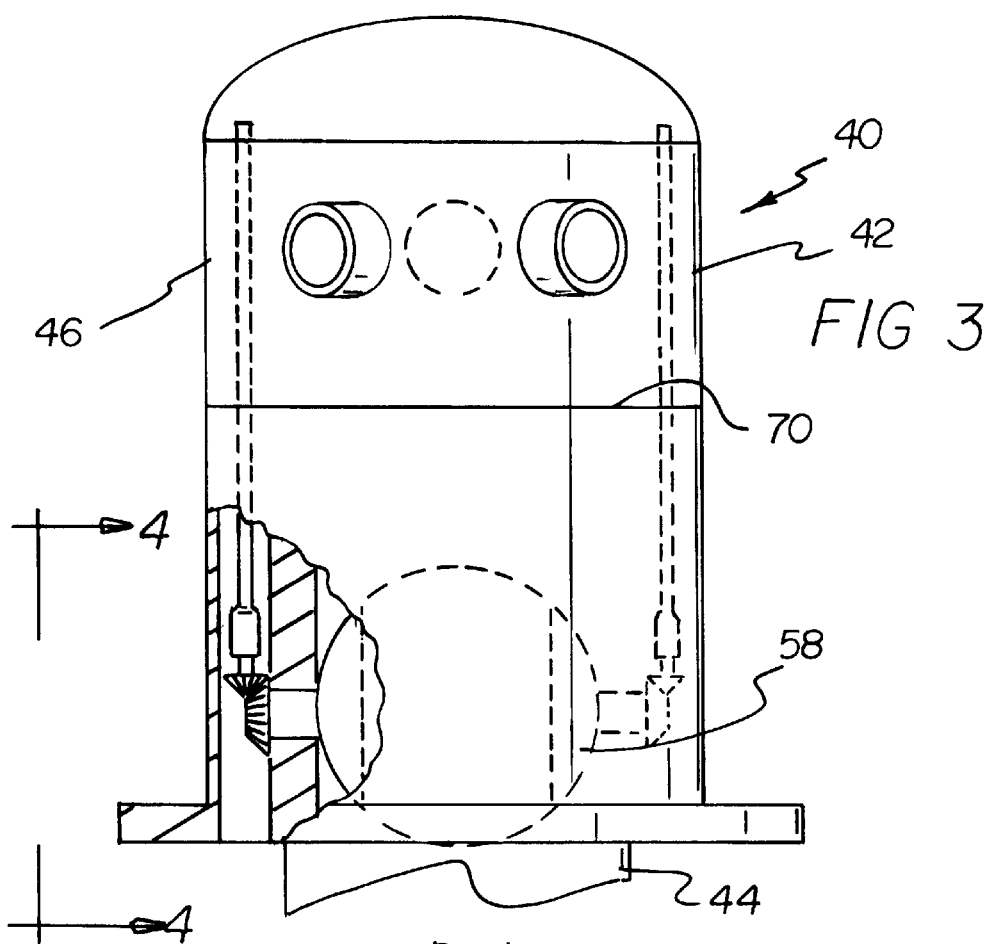
FIG. 3 is an illustration of the secondary embodiment of the ball valve control means employed in a hydrant.
Figure 4:
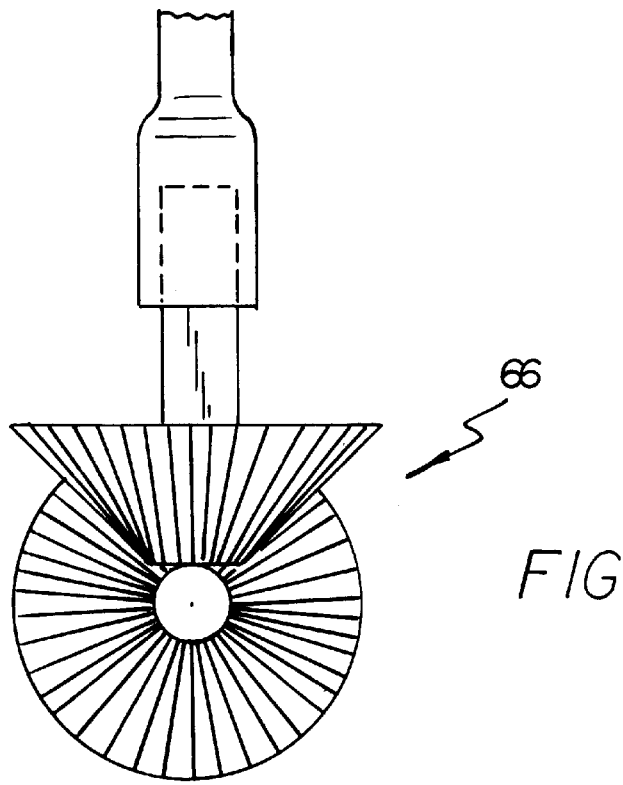
FIG. 4 is a detail of the bevel gear system employed in the present invention.

The fire hydrant 40 embodiment depicted in FIG. 3 works similar to the embodiment of FIG. 5. However, in this secondary hydrant embodiment the ball valve 58 is located above ground and above the base flange 48. Additionally, the secondary hydrant embodiment does not employ the flexible fluid couplings depicted in FIG. 5. The hydrant of FIG. 3 can also employ a break point 70 as described hereinabove in association with FIG. 5.

Figure 7:
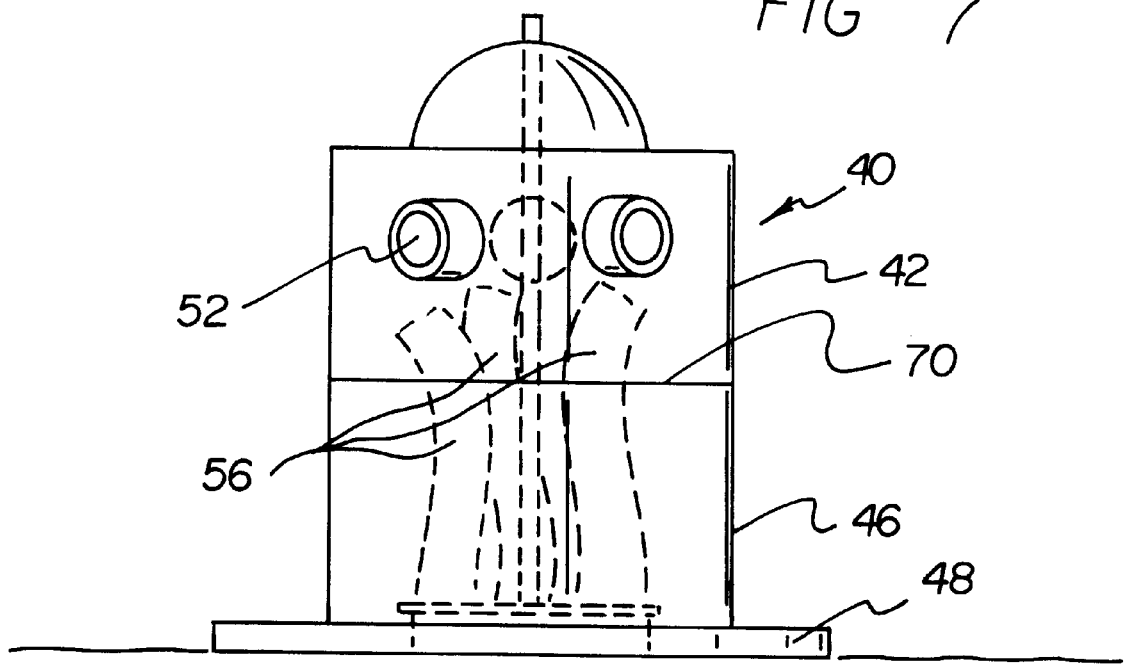
FIG. 7 is a view of another hydrant embodiment.
Figure 8:
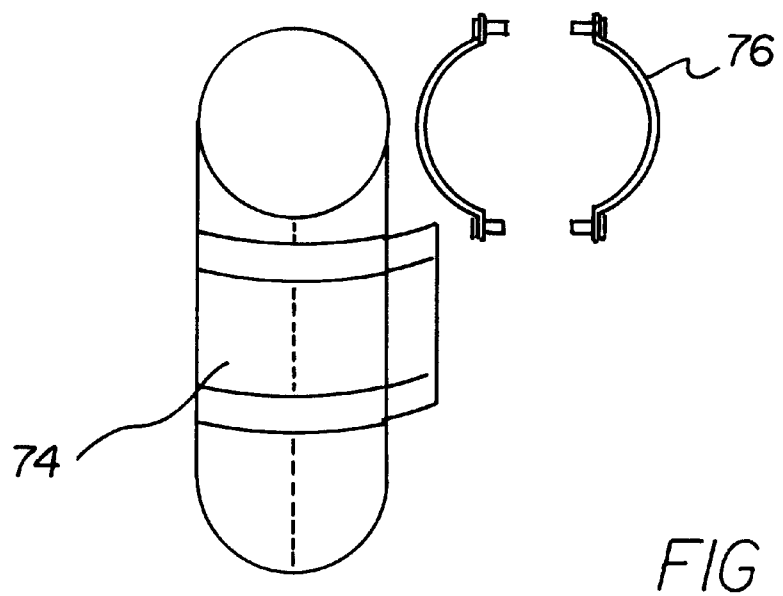
FIG. 8 illustrates a flexible coupling system.

FIG. 7 illustrates a hydrant which can employ either the above ground or below ground ball valve. The hydrant of FIG. 7, however, employs a centrally disposed control rod. This rod functions identically to the control rods of the previous two embodiments, however, is centrally positioned. Lastly, FIG. 8 illustrates a flexible covering 74, with associated rigid clamps 76. This flexible covering is adapted to be positioned over a hydrant in the event it is hit by a vehicle. Specifically, if the upper and lower portion of the hydrant housing have not become separated, the combination of the covering 74 and clamps 76 can be positioned around the hydrant to keep it together.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved ball valve assembly for use in combination with a ground mounted fire hydrant, the assembly comprising in combination:

a fire hydrant housing having a lower extent, an upper extent and an intermediate extent therebetween, a base flange secured intermediate the upper and lower extents for use in securing the hydrant to the ground such that the lower extent extends into the ground, three outlets formed within the upper extent of the hydrant;

a water passage formed within the lower extent of the hydrant housing, three flexible fluid couplings, each of the fluid couplings interconnecting the water passage to one of the three outlets formed within the upper extent of the housing;

a ball valve rotatably secured within the water passage a fluid passage formed within a diameter of the ball valve, the ball valve having a first orientation wherein the ball valve prevents the flow of fluid within the water passage, and a second orientation wherein fluid is permitted to flow through the fluid passage of the ball valve and within the water passage;

a pair of rotatable control rods extending along the upper and lower extent of the hydrant housing, each of the control rods interconnected to a bevel gearing for use in controlling the orientation of the ball valve, thus rotation of the control rods in a first sense functioning to bring the ball valve into the first orientation, while rotation of the control rods in a second sense functioning to bring the ball valve into a second orientation.

2. A new and improved ball valve assembly for use in combination with a ground mounted fire hydrant, the assembly comprising in combination:

a fire hydrant housing having a lower extent, an upper extent and an intermediate extent therebetween, a base flange secured intermediate the upper and lower extents for use in securing the hydrant to the ground such that the lower extent extends into the ground, a number of outlets formed within the upper extent of the hydrant;

a water passage formed within the lower extent of the hydrant housing, a number of flexible fluid couplings, each of the fluid couplings interconnecting the water passage to one of the outlets formed within the upper extent of the housing;

a ball valve rotatably secured within the water passage, a fluid passage formed within a diameter of the ball valve, the ball valve having a first orientation wherein the ball valve prevents the flow of fluid within the water passage, and a second orientation wherein fluid is permitted to flow through the fluid passage of the ball valve and within the water passage;

control means for effecting the orientation of the ball valve.

3. The hydrant as described in claim 2 wherein the control means includes:

a pair of rotatable control rods extending along the upper and lower extent of the hydrant housing, the control rods being interconnected to the ball valve such that rotation of the control rods in a first sense functioning to bring the ball valve into the first orientation, while rotation of the control rods in a second sense functioning to bring the ball valve into a second orientation.

* * * * *